United States Patent [19]
Ando

[11] Patent Number: 5,832,121
[45] Date of Patent: Nov. 3, 1998

[54] METHOD AND APPARATUS FOR VIDEO DATA COMPRESSION

[75] Inventor: Yuji Ando, Kanagawa, Japan

[73] Assignee: Sony Corporation, Tokyo, Japan

[21] Appl. No.: 899,958

[22] Filed: Jul. 24, 1997

Related U.S. Application Data

[63] Continuation of Ser. No. 534,659, Sep. 27, 1995.

[30] Foreign Application Priority Data

Sep. 27, 1994 [JP] Japan .................................. 6-235102

[51] Int. Cl.⁶ .............................. G06K 9/36; G06K 9/46; H04N 1/417; H04N 5/14
[52] U.S. Cl. ......................... 382/236; 348/402; 348/416; 348/700; 358/261.2; 358/430; 358/433
[58] Field of Search .............................. 358/261.1, 261.2, 358/261.3, 261.4, 426, 428, 430, 431, 433, 447, 448, 461, 463; 382/236, 239; 341/76; 348/400, 401, 402, 390, 384, 409, 415, 416, 699, 700

[56] References Cited

U.S. PATENT DOCUMENTS

| | | | |
|---|---|---|---|
| 5,381,275 | 1/1995 | Nitta et al. | 360/48 |
| 5,440,345 | 8/1995 | Shimoda | 348/411 |
| 5,471,450 | 11/1995 | Yonemitsu et al. | 369/60 |
| 5,510,840 | 4/1996 | Yonemitsu et al. | 348/416 |
| 5,543,846 | 8/1996 | Yagasaki | 348/415 |
| 5,565,921 | 10/1996 | Sasaki et al. | 348/412 |
| 5,592,226 | 1/1997 | Lee et al. | 348/416 |

*Primary Examiner*—Edward L. Coles
*Assistant Examiner*—Kimberly A. Williams
*Attorney, Agent, or Firm*—Frommer Lawrence & Haug LLP; William S. Frommer; Dennis M. Smid

[57] ABSTRACT

A method and apparatus for encoding a picture advantageously employed for encoding a picture. A plurality of input picture data are stored, and the quantity of the information of the input picture data from the plural stored picture data is evaluated for detecting a scene change. A GOP of a preset unit length, made up of a picture formed by compression by intra-frame coding and a picture formed by compression by inter-frame predictive coding, is selected based upon a scene change detection output and the input picture data is encoded in a pre-set manner in accordance with the selected GOP. By detecting a scene change and selecting the intra-frame coding as a compression method responsive to scene change detection, the compression efficiency is raised at a scene change portion of the input picture data where the correlation between previous and succeeding pictures is lowered.

7 Claims, 7 Drawing Sheets

METHOD AND APPARATUS FOR VIDEO DATA COMPRESSION

This application is a continuation of application Ser. No. 08/534,659, filed Sep. 27, 1995.

BACKGROUND OF THE INVENTION

1. Field of the Invention

This invention relates to a method and apparatus for encoding a picture advantageously employed for encoding a picture by way of data compression.

2. Description of the Related Art

Figure 1:
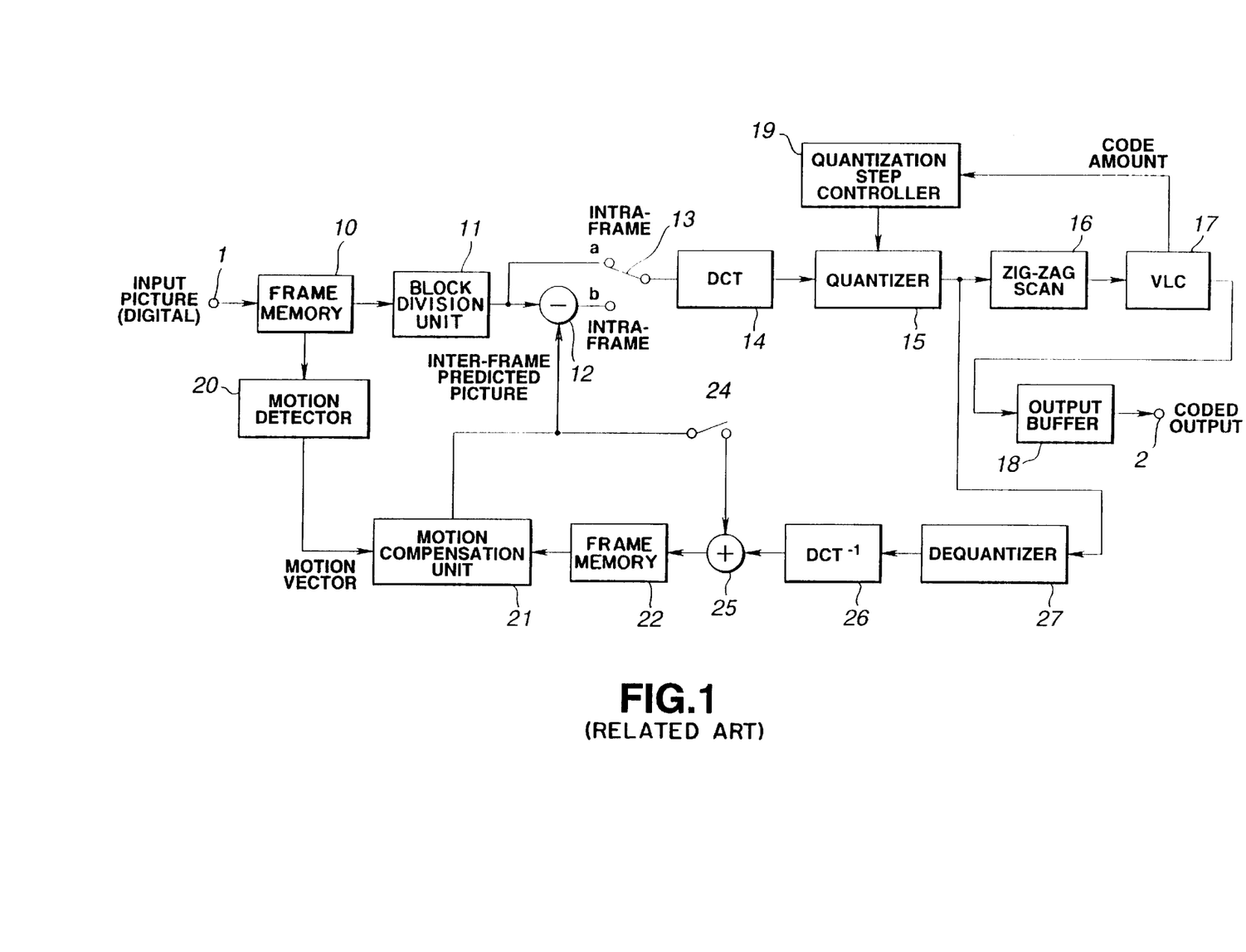
FIG. 1 is a schematic block circuit diagram showing an arrangement of a conventional picture encoding device.
Figure 2:
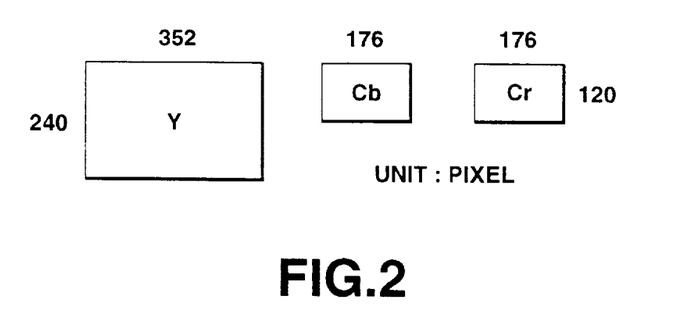
FIG. 2 illustrates the construction and resolution of a picture.

FIG. 1 shows a conventional arrangement of a device for encoding a moving picture by way of data compression. With the picture encoding device shown in FIG. 1, digitized picture data of luminance components (Y), chroma components (Cb) and chroma components (Cr), with the numbers of pixels equal to 352(H)×240(V)×30 frames, 174(H)×120(V)×30 frames and 174(H)×120(V)×30 frames, respectively, are fed to an input terminal 1.

The input picture data, entering the input terminal 1, is sent to a motion detector 20 and a block division unit 11 via a frame memory 10 configured for transiently storing the input picture data and re-arraying the picture data according to a pre-set sequence.

Figure 3:
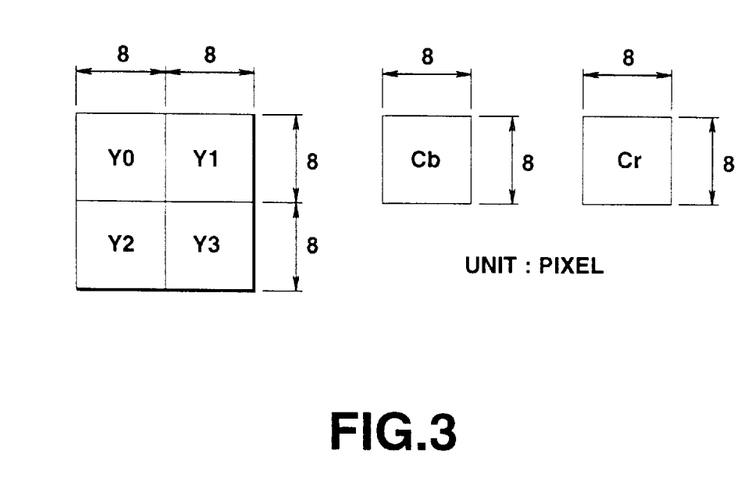
FIG. 3 illustrates blocks and a macro-block.

The block division unit 11 divides luminance components (Y) and chroma components (Cr), (Cb) of each frame supplied from the frame memory 10 into 8×8 pixel blocks, as shown in FIG. 3. The four blocks of the luminance components (Y0, Y1, Y2 and Y3), one chroma block (Cb) and one chroma block (Cr), totalling six blocks (Y0, Y1, Y2, Y3, Cb and Cr), are termed a macro-block.

The macro-block-based data from the block division unit 11 are sent to a subtractive unit 12.

The subtractive unit 12 finds a difference between data from the block division unit 11 and inter-frame predictively coded picture data as later explained and sends the resulting difference to a fixed terminal b of a changeover switch 13 as data for inter-frame predictive coding, as explained later. The data from the block division unit 11 is supplied to the other fixed terminal a of the changeover switch 13 as data of a frame for intra-frame coding, as explained later.

The block-based data from the changeover switch 13 is transformed by DCT by a DCT circuit 14 from which the resulting DCT coefficients are sent to a quantizer 15. The quantizer 15 quantizes the DCT output with a pre-set quantization step width and the resulting quantized coefficients are sent to a zig-zag scan circuit 16.

Figure 4:
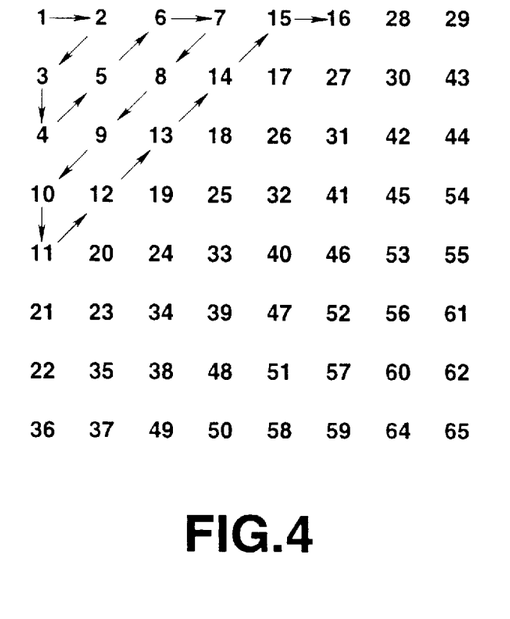
FIG. 4 illustrates zig-zag scan.

The zig-zag scan circuit 16 re-arrays the quantized coefficients according to zig-zag scan as shown in FIG. 4 and sends the resulting output to a variable length encoding circuit 17. The variable length encoding circuit 17 variable length encodes output data of the zig-zag scan circuit 16 and sends the resulting output to an output buffer 18 while sending the information specifying the quantity of codes generated by variable length encoding to a quantization step controller 19. The quantization step controller 19 controls the quantization step width of the quantizer 15 based upon the information specifying the quantity of codes from the variable length encoding circuit 17. Output data of the output buffer 18 is outputted as a compressed coded output at an output terminal 2.

An output of the quantizer 15 is de-quantized by a de-quantizer 27 and inverse-transformed by an inverse DCT circuit 26. An output of the inverse DCT circuit 26 is sent to an addition unit 25.

The addition unit 25 is also fed with inter-frame predictively coded picture data from a motion compensation unit 21 via a changeover switch 24 which is turned on for a frame produced by inter-frame predictive coding. Thus the inter-frame predicted picture data is summed to the output data of the inverse DCT circuit 26. Output data of the addition unit 25 is temporarily stored in a frame memory 22 and thence supplied to the motion compensation unit 21.

The motion compensation unit 21 effects motion compensation based upon the motion vector detected by the motion detection unit 20 and outputs the resulting inter-frame predictively-coded picture data.

An illustrative sequence of operations of the conventional picture encoder shown in FIG. 1 is explained in detail. For convenience in explanation, the following appellation is used for the respective frames.

The frames arrayed in the display sequence are termed I0, B1, B2, P3, B4, B5, P6, B7, B8, I9, B10, B11, B12, . . . . Of these frames, I, P and B refer to the sorts of the methods for data compression, as later explained, and the numerals next to I, P and B simply indicate the display sequence.

For compressing these pictures, the MPEG 1 of the MPEG (Moving Picture Expert Group) which is a work group for international standardization of the color moving picture encoding system, provides the following.

First, the picture I0 is compressed. Next, the picture P3 is compressed. At this time, it is not the picture P3 itself but difference data between P3 and I0 that is compressed.

Next, the picture B1 is compressed. At this time, it is not the picture B1 itself, but difference data between the pictures B1 and I0, between pictures B1 and P3 or between the picture B1 and mean values of the pictures I0 and P3, whichever is smaller in the information volume, that is compressed.

Next, the picture B2 is compressed. At this time, it is not the picture B2 itself, but difference data between the pictures B2 and I0, difference data between pictures B2 and P3 or a difference between the picture B2 and the mean values of the pictures I0 and P3, whichever is smaller in the information volume, that is compressed.

Next, the picture P6 is compressed. At this time, it is not the picture P6 itself, but difference data between the pictures P6 and P3, that is compressed.

The following describes the above-described processing in the sequence in which it is executed.

|      | pictures to be processed | counterpart of taking difference |
| ---- | ------------------------ | -------------------------------- |
| (1)  | I0                       | —                                |
| (2)  | P3                       | I0                               |
| (3)  | B1                       | I0 or P3                         |
| (4)  | B2                       | I0 or P3                         |
| (5)  | P6                       | P3                               |
| (6)  | B4                       | P3 or P6                         |
| (7)  | B5                       | P3 or P6                         |
| (8)  | P9                       | P6                               |
| (9)  | B7                       | P6 or P9                         |
| (10) | B8                       | P6 or P9                         |
| (11) | I9                       | —                                |
| (12) | P12                      | I0                               |
| (13) | B10                      | I9 or P12                        |
| (14) | B11                      | I9 or P12                        |

In this manner, the encoding sequence is I0, P3, B1, B2, P6, B4, B5, P9, B7, B8, I9, P12, B10, B11, . . . and thus changed from the display sequence. The compressed data, that is encoded data, are arrayed in this encoded sequence.

The above is explained in further detail along with the operation of the picture encoding device shown in FIG. 1.

In encoding the first picture I0, data of a picture to be compressed first are outputted by the frame memory 10 and blocked by the block dividing unit 11. The block dividing unit 11 outputs block-based data in the sequence of Y0, Y1, Y2, Y3, Cb and Cr. The block-based output data is routed via the changeover switch 13 set to the side of the fixed terminal a to the DCT circuit 14. The DCT circuit 14 orthogonally transforms the block-based data with two-dimensional discrete cosine transform. This converts data from the time axis into that on the frequency axis.

The DCT coefficients from the DCT circuit 14 are sent to the quantizer 15 where it is quantized at a pre-set quantization step width. The DCT coefficients are then re-arrayed in a zig-zag sequence by the zig-zag scan circuit 16 as shown in FIG. 4. If the DCT coefficients are arrayed in a zig-zag sequence, the coefficient values are those of higher frequency components towards the back so that the coefficient values become smaller towards the back. Thus, if the coefficient data are quantized at a certain value S, the probability of the result of quantization becoming zero becomes higher towards the back so that higher frequency components are removed.

The quantized coefficients are then sent to the variable length coding (VLC) circuit 17 so as to be processed with Huffman coding. The resulting compressed bitstream is temporarily stored in the output buffer 18 and thence outputted at a pre-set bit rate. The output buffer 18 is a buffer memory for outputting an irregularly generated bitstream at a pre-set bit rate.

The above-described compression of a sole picture is termed intra-frame coding and the resulting picture is termed an I-picture.

A decoder receiving the bitstream of the I-picture performs an operation which is the reverse of the above-described operation for completing the first picture.

The second picture, that is the picture P3, is encoded in the following manner.

The second picture may be compressed as I-pictures to generate a bitstream. However, for improving the compression ratio, the second picture may be compressed in the following manner for taking advantage of correlation between the contents of the continuous pictures.

First, the motion detection unit 20 finds, in the first picture I0, a pattern similar to each macro-block constituting the second picture, and represents the pattern in terms of coordinates of relative positions (x, y) termed a motion vector.

With the second picture, the respective blocks are not directly sent to the DCT circuit 14, as in the case of the I-picture described above. That is, difference data between each block of the second picture and a block referenced from the first picture in accordance with the block-based motion vector, that is the difference data of the subtractive unit 12, is sent to the DCT circuit 14.

If the correlation between the pattern of the first picture represented by the motion vector and the pattern of the block now to be encoded is extremely strong, the difference data becomes extremely small, so that the amount of compressed data becomes smaller when the motion vector and the difference data are encoded than when the block is compressed by the intra-frame coding.

The above-described compression method is termed the inter-frame predictive coding. The difference data is not necessarily smaller and, depending upon the picture pattern, that is the contents of the picture, the compression ratio becomes higher with intra-frame coding than with coding the difference data. In such case, data is compressed by the intra-frame coding. Which of the inter-frame predictive coding or the intra-frame coding is to be employed differs from one macro-block to another.

If the above is to be explained in connection with the picture encoder shown in FIG. 1, the picture which is the same as the picture produced on the decoder side needs to be produced on the encoder side at all times if the inter-frame predictive coding is to be achieved.

To this end, there is provided in the encoder a circuit which is the same as the decoder. This circuit, termed a local decoder, includes the inverse DCT circuit 27, inverse DCT circuit 26, addition unit 25, frame memory 22 and the motion compensation unit 21 shown in FIG. 1. The picture stored in the frame memory 22 is termed a locally decoded picture or locally decoded data. The data of a picture not yet compressed is termed an original picture or original data.

During compression of the first picture, that is the I-picture I0, the first picture decoded by the local decoder is stored in the frame memory 22. Noteworthy is the fact that the picture produced by the local decoder is not the pre-compression data but is the compressed and decoded picture and hence is the same picture as the picture which is to be decoded by the decoder and thus suffers from deterioration in the picture quality ascribable to compression.

It is to the encoder under such condition that data of the second picture P3 (original data) is entered. The motion vector must have been pre-detected by this time. Such data has the motion vector from block to block. Such motion vector is supplied to the motion compensation unit 21. The motion compensation unit 21 outputs data on the locally decoded partial picture specified by the motion vector (motion compensated data or MC data: one macro-block) as the inter-frame predicted picture data.

Pixel-based difference data from the subtractive unit 12 between the second original data and the motion compensated data (inter-frame predicted picture data) enters the DCT circuit 14. The method for compression since this time is basically the same as that for the I-picture. The picture compressed by the above-described compressing method is termed the forward predictive coded picture or P-picture.

More specifically, all macro-blocks of the P-picture are not necessarily compressed by the inter-frame predictive coding. If intra-frame coding is judged to give a higher coding efficiency for a given macro-block, the macro-block is encoded by intra-frame coding.

That is, with the P-picture, the intra-frame coding or the inter-frame predictive coding is selected for compression from one macro-block to another. The macro-block coded by intra-frame coding and that coded by inter-frame predictive coding are termed an intra-macro-block and an inter-macro-block, respectively.

With the above local decoder, as described above, an output of the quantizer 15 is de-quantized by the de-quantizer 27 and inverse orthogonal transformed by the inverse DCT circuit 26. During encoding, the motion-compensated data (MC data) is added to the output of the inverse DCT circuit 26 to give an ultimate locally decoded picture.

The third picture, that is the picture B1, is encoded in the following manner.

For encoding the third picture (B1 picture), the motion vector for each of the pictures I0 and P3 is searched. The motion vector for the picture I0 is termed the forward vector MVf(x,y), while the motion vector for the picture P3 is termed the backward vector MVb(x,y).

For this third picture, difference data is similarly compressed. It matters which data should be compressed. It is sufficient if the difference is taken with respect to a picture which will give the smallest amount of the information by difference taking. There are four alternatives for the method for compression, namely (1) employing the difference from data on the picture I0 indicated by the forward vector MVf(x,y);

(2) employing the difference from data on the picture P3 indicated by the backward vector MVb(x,y);

(3) employing the difference between mean values of data on the picture I0 indicated by the forward vector MVf(x,y) and data on the picture P3 indicated by the backward vector MVb(x,y); and (4) not employing the difference, that is encoding the third picture by intra-frame coding.

One of these four methods for compression is selected on the macro-block basis. With the alternatives (1) to (3), the respective motion vectors are sent to the motion compensation unit 21. The subtractive unit 12 takes the difference between the macro-block data and the motion-compensated data. The resulting difference is sent to the DCT circuit 14. With the alternative (4), the data is directly sent to the DCT circuit 14.

The above-described operation becomes feasible since two pictures, namely the pictures I0 and P3, have been restored by the encoding of the first and second pictures in the frame memory 22 configured for storing the locally decoded picture.

The fourth picture, that is the picture B2, is encoded in the following manner.

The encoding of the fourth picture B2 is carried out in the same manner as for the encoding of the third picture B1 except that "B1" in the previous description of the encoding method for the third picture B1 now reads "B2".

The fifth picture, that is the picture P6, is encoded in the following manner.

The encoding of the fifth picture P6 is carried out in the same manner as for the encoding of the second picture P3 except that "P3" and "I0" in the previous description of the encoding method for the second picture P3 now read "P6" and "P2", respectively.

The encoding of the sixth picture B4 is not made since it is the repetition of the above-described encoding operations.

The MPEG provides a group-of-picture (GOP).

That is, a group of plural pictures is termed a group-of-pictures (GOP). The GOP must consist of continuous pictures in terms of the encoded data, that is the compressed data. On the other hand, the GOP takes account of random accessing and, to this end, the first picture in the GOP needs to be the I-picture. In addition, the last picture in the GOP in the display sequence must be an I-picture or a P-picture.

Figure 5A:
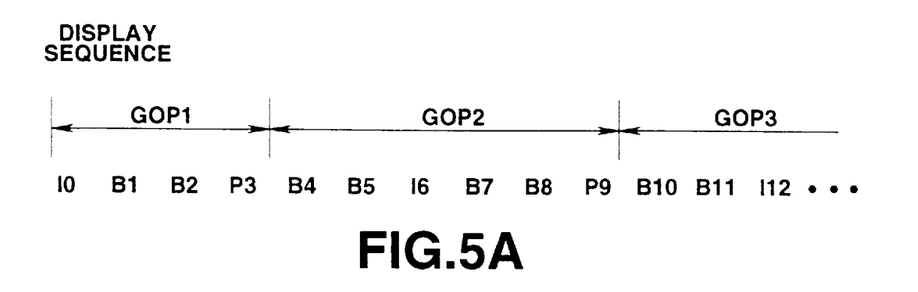
FIGS. 5A and 5B illustrate a typical GOP in the display sequence and in the encoding sequence, respectively.
Figure 5B:
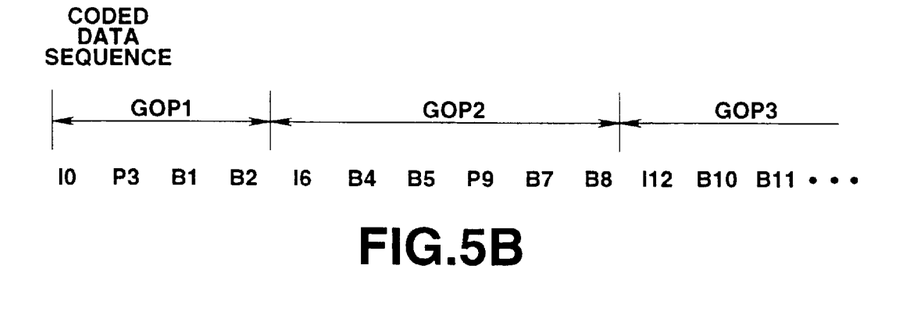

FIG. 5 shows an example in which the first GOP consists of four pictures and the second GOP2 consist of six pictures. FIGS. 5A and 5B illustrate the display sequence and the sequence of the encoded data, respectively.

If, in FIG. 5, attention is directed to the GOP2, since the pictures B4 and B5 are formed from the pictures P3 and I6, the pictures B4 and B5 cannot be decoded correctly if the picture I6 is accessed by random access, since there is not the picture P3. The GOP which cannot be correctly decoded within itself is said to be not closed.

Conversely, if the pictures B4 and B5 only refer to the picture I6, the pictures B4 and B5 can be decoded correctly if the pictures B4 and B5 access the picture I6 by random access, since the picture P3 is not required. The GOP which can be fully decoded from the information within itself is said to be closed.

Data compression is done by the most efficient one of the above-described compressing methods. The quantity of the encoded data thus generated also depends on the input picture and can be known only after actual data compression.

However, it is also necessary to manage control for providing a constant bit rate of the compressed data. The parameter for managing such control includes the quantization step or quantization scale (Q-scale) as the information specifying the quantity of the codes applied to the quantizer 15. The larger or smaller the quantization step, the smaller and larger is the quantity of generated bits for the same compression method.

The value of the quantization step is controlled in the following manner.

For assuring a constant bit rate of the compressed data, the output buffer 18 is provided at an output of the encoder. The output buffer operates for absorbing the difference in the difference in the amount of the generated data within a certain extent from picture to picture.

However, if data is generated at a rate surpassing a pre-set rate, the residual data quantity in the output buffer 18 is increased thus producing data overflow. Conversely, if data is generated at a rate lower than the bit rate, the residual data quantity in the output buffer is decreased thus ultimately producing data underflow.

Thus the encoder is configured for feeding back the residual data quantity in the output buffer 18 so that the quantization step controller 19 controls the quantization step of the quantizer 15, in such a manner that, if the residual data quantity in the output buffer 18 becomes smaller, the quantization step is controlled to be smaller to refrain from excessive compression and, if the residual data quantity of the output buffer 18 becomes larger, the quantization step is controlled to be larger to raise the compression ratio.

On the other hand, there exists a considerable difference in the range of the quantity of the encoded data generated by the above-described compressing method (the above-described intra-frame coding and inter-frame coding).

If data compression is done by the intra-frame coding, a large quantity of data is produced, so that, if the vacant capacity of the output buffer 18 is small, the quantization step size needs to be increased. If the quantization step size is maximized, data overflow in the output buffer 18 may occasionally be produced. If the generated data can be stored in the buffer 18, the intra-frame encoded picture produced with a larger quantization step affects the picture quality of subsequently produced inter-frame predictively-coded pictures. In this consideration, a sufficient vacant capacity of the output buffer 18 is required before proceeding to data compression by intra-frame coding.

Thus the compression method of a pre-set sequence is provided, while the quantization step controller 19 effects feedback control of the quantization step size for assuring a sufficient vacant capacity of the output buffer 18 prior to the intra-frame coding.

The above renders it possible to suppress the bit rate of the encoded data to a pre-set value.

The intra-frame coded picture is of a larger data size after data compression. In general, the larger the number of the inter-frame predicted pictures, the higher becomes the picture quality for a mean bit rate.

However, in many cases, the intra-frame coded pictures are inserted at a fixed interval so as to be used as a demarcation between GOPs in view of random accessibility.

On the other hand, with the bi-directionally coded pictures, among the inter-frame prediction coded pictures, the data size becomes significantly smaller. On the other hand, a larger number of the inter-frame prediction coded pictures, in particular the B-pictures, may be introduced for a single intra-frame coded picture, the mean bit rate via the output buffer may be maintained at a lower value while maintaining a moderate picture quality.

However, with a picture exhibiting extremely low correlation with the directly previous picture, such as a picture directly after a scene change, efficient data compression cannot be achieved with the inter-frame predictive coding. Rather, the intra-frame coded picture gives higher compression efficiency. For such picture, the intra-frame coding is preferred.

However, in such case, a picture different from the intra-frame coded picture used for demarcating the GOP is inserted as an intra-frame coded picture, resulting in a higher rate of the intra-frame coded pictures to the inter-frame predictive coded pictures in the GOP. Thus, if the bit rate of the output data is to be suppressed to below a pre-set value, the picture quality is necessarily lowered.

In addition, it is inconvenient if, for demarcating the GOPs for random accessing, scene transitions are not coincident with the GOP junction points.

On the other hand, it is a rare occurrence that, if a sequence is encoded so that it is terminated at a pre-set frame, the last picture represents the junction point of the GOP to the next GOP. There is also a risk that the last GOP be of short duration to impair the picture quality at the ultimate end.

Although it is possible to encode data and feed back the results for re-partitioning the GOPs, this gives only a poor encoding efficiency while being unfit for a real-time encoder.

In addition, there is imposed a limitation that, while the last picture is not necessarily the I-picture or the P-picture, the GOP must be terminated by the I-picture or the P-picture. However, re-encoding leads to poor encoding efficiency, while encoding of all combinations leads to an increased scale of the apparatus.

SUMMARY OF THE INVENTION

It is therefore an object of the present invention to provide a picture encoding apparatus whereby picture compression may be achieved with high efficiency to lead to improved picture quality.

The present invention provides a picture encoding apparatus comprising picture data storage means for storing a plurality of input picture data, scene change detection means for evaluating the quantity of the information of the input picture data from the plural picture data stored in the picture data storage means for detecting a scene change, selection means for selecting a GOP of a preset unit length made up of a picture formed by compression by intra-frame coding and a picture formed by compression by inter-frame predictive coding based upon a scene change detection output supplied from said scene change detection means and compression encoding means for compression encoding the input picture data in a pre-set manner in accordance with the GOP selected by the selection means.

Preferably, the selection means is responsive to a scene detection output of the scene change detection means for adaptively changing the number of pictures for intra-frame coding and the number of pictures for inter-frame predictive coding in the GOP for determining the GOP. Preferably, the selection means changes a given inter-frame predictively coded picture to an other inter-frame predictively coded picture in the GOP based upon a output of the unit length control means.

Preferably, the selection means sets the GOP responsive to the scene change detection output only when the ratio of the number of the pictures for inter-frame predictive coding to the number of pictures for intra-frame predictive coding exceeds a pre-set ratio. In other words, if the ratio of the number of the pictures for inter-frame predictive coding to the number of pictures for intra-frame predictive coding is smaller than the pre-set ratio, the length of the pre-set unit is protracted without being coincided with the scene change detection output.

According to the present invention, the quantity of the information of input picture data is evaluated for detecting a scene change and the intra-frame coding is selected as a compression method responsive to scene change detection for raising the compression efficiency at a scene change portion of the input picture data where the previous and succeeding pictures are correlated with each other to a lesser extent.

In addition, according to the present invention, the length of the pre-set unit is preferably changed responsive to scene change detection for coinciding the scene change with the boundary between the pre-set units.

Furthermore, if the ratio of the number of the pictures for inter-frame predictive coding to the number of pictures for intra-frame predictive coding is smaller than the pre-set ratio, the length of the pre-set unit is protracted without being coincided with the scene change detection output, thereby suppressing the bit rate of the output data to a pre-set value for maintaining the picture quality.

DESCRIPTION OF THE PREFERRED EMBODIMENTS

Referring to the drawings, preferred embodiments of the present invention will be explained in detail.

Figure 6:
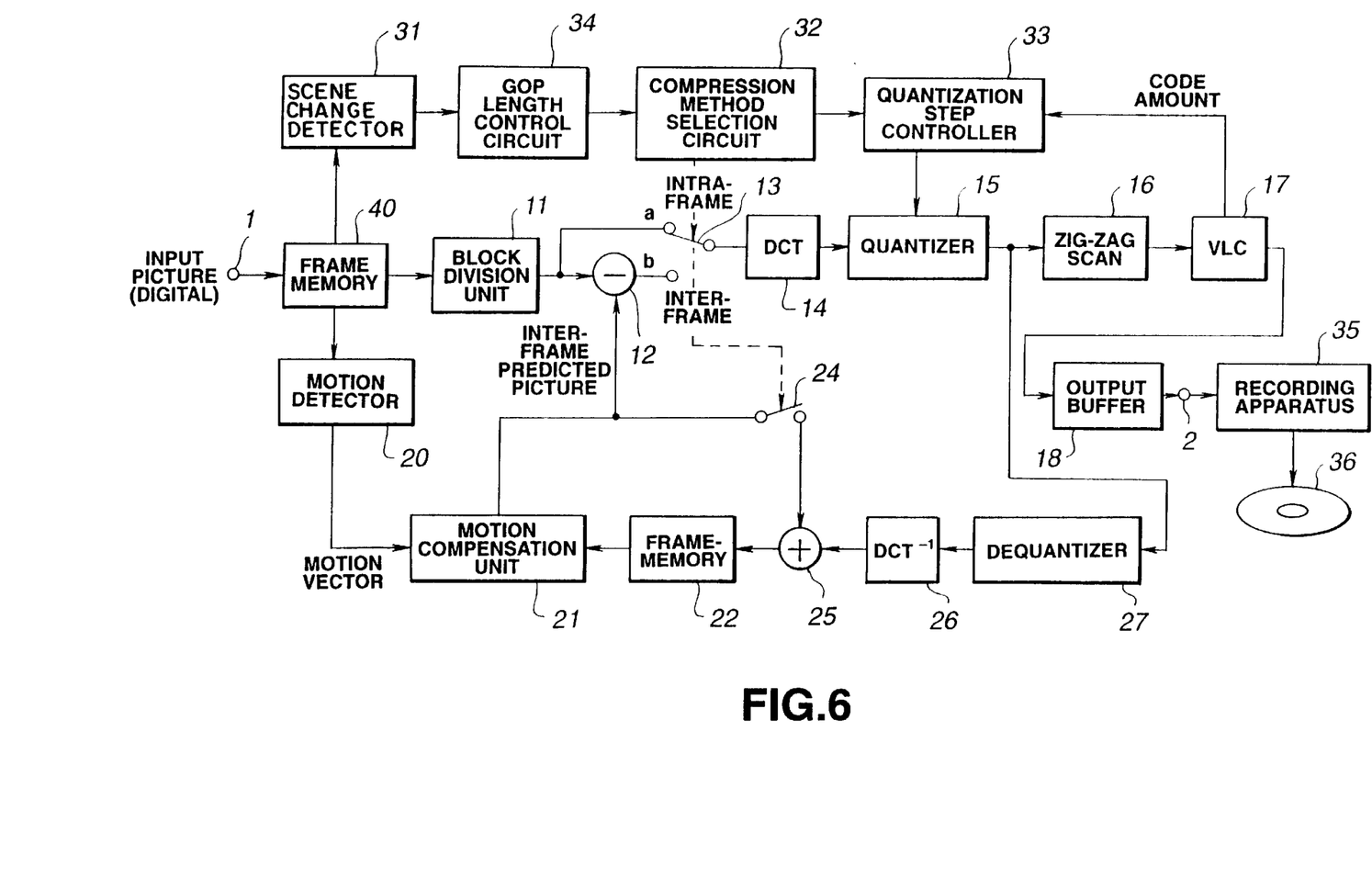
FIG. 6 is a schematic block circuit diagram of a picture encoding device embodying the present invention.

FIG. 6 shows a schematic arrangement of a picture encoding apparatus (encoder) embodying the present invention. In FIG. 6, the parts or components which are the same as those shown in FIG. 1 are depicted by the same numerals and the corresponding description is omitted for clarity.

In the arrangement of FIG. 6, the components added to the arrangement of FIG. 1 are a scene change detection circuit 31, a GOP length control circuit 34 and a compression method selection circuit 32. A frame memory 40 and a quantization step controller are modified from the corresponding components of FIG. 1.

Thus the picture encoder of the present embodiment includes the frame memory 40, as picture data storage means for storing plural frames of input picture data, and the scene change detection circuit 31 for evaluating the amount of the information of the input picture data from the picture data of plural frames stored in the frame memory 40 for detecting scene changes. The encoder also includes selection means for selecting the compression methods for selection by intra-frame coding based upon the supply of a scene change detection output from the scene change detection circuit 31, and components from a subtractive unit 12 to a variable length encoding circuit 17, as compression encoding means for compressing the input picture data in accordance with the compression method as selected by the selection means. The encoder also includes a local decoder and motion detection unit 20 and a motion compensation unit 21.

The selection means includes a GOP length control circuit 34 as unit length control means for adaptively changing the number of intra-frame coded pictures and the number of inter-frame predictively coded pictures in a pre-set unit of pictures made up of plural pictures (GOP) responsive to a scene change detection output from the scene change detection output 31 for setting the GOP length, and a compression method selection circuit 32 for selecting the compression methods for respective pictures in the GOP based upon an output of the GOP length control circuit 34.

The selection means sets the GOP length responsive to the scene change detection output only when the ratio of the number of the inter-frame predictively coded pictures to the number of the intra-frame coded pictures surpasses a pre-set value. In other words, if the ratio of the number of the inter-frame predictively coded pictures to the number of the intra-frame coded pictures is lower than the pre-set value, the GOP length is not of a length corresponding to the scene change detection output, but is protracted, by way of an example.

Referring to FIG. 6, input picture data entering an input terminal 1 is stored in the frame memory 40. The frame memory 40 differs from the frame memory 10 of FIG. 1 in that it is capable of storing a pre-set number of frames. The pre-set number of frames needs to be larger than the number of pictures corresponding to the GOP length when the number of inter-frame predictive coded pictures contained in the GOP is sufficient to assure a moderate picture quality for a case in which only one intra-frame coded picture is contained in the GOP. In other words, the number of frames stored in the frame memory 40 needs to be larger than the number of the inter-frame predictively-coded pictures for one intra-frame coded pictures which is sufficient to assure a moderate picture quality. That is, the number of frames stored in the frame memory 40 needs to be such a number as to assure that, if a picture being encoded is encoded by intra-frame coding, intra-frame coding is not done until a number of inter-frame predictive coded pictures sufficient to eke out or cancel the quantity of data produced by such intra-frame coding may be continuously sent out from the frame memory 40.

Of course, the pre-set number is not limited to that defined above and may be of a larger value for conforming to a variety of operating conditions. For example, if the encoder is of the type in which rate control is done after pre-setting the GOP, the frame memory 40 needs to be of a capacity sufficient to store pictures until setting the GOP length and starting the encoding.

The picture data stored in the frame memory 40 are supplied to the scene change detection circuit 31.

A scene change may be said to be a point in the picture data where correlation between preceding and succeeding pictures is impaired significantly. In the present embodiment, the sum of difference values between the current picture and the picture following motion vector compensation is found for the entire picture and compared to the corresponding difference values for the directly previous picture for detecting a scene change.

For example, for detecting a scene change, roughly two parameters are calculating by way of evaluating the picture information.

The first parameter specifies the amount of the information for enabling the post-compression quantity of data in case compression is done by intra-frame coding. The first parameter may be the sum or statistic values of DCT coefficients obtained by block-based DCT of picture data supplied from the frame memory 40. If the parameter found in this manner is of an excessive scale, it may also be the block-based sums of mean square errors of the DCT coefficients. In sum, the parameter which represents the quantity of the picture information and which is sufficient to infer the post-compression data quantity is employed as the first parameter.

The second parameter specifies the quantity of the differential picture information which enables the post-compression data quantity to be predicted in case the compression is done by the inter-frame predictive coding. The parameter may for example be the in-block sum of the difference values between the picture stored in the frame memory 40 and the motion-compensated picture. For calculating the parameter, the least error for detecting the motion vector, obtained in a common motion vector detection circuit (motion detection unit 20) may be employed.

The GOP length control circuit 34 then controls the GOP length, based upon the scene change detection output from the scene change detection circuit 31, as explained later by referring to the flow charts of FIGS. 7 and 8.

The GOP length information, as set by the GOP length control circuit 34, is sent to the compression method selection circuit 32.

It is noted that an intra-frame coded picture must be present at least at an initial portion of the GOP. Since the GOP is of a certain length in view of random accessibility, intra-frame coded pictures occur periodically or with scene changes. Thus the compression method selection circuit 32 is fed not only with the information specifying the GOP length from the GOP length control circuit 34 but also with the picture counts and an output of the scene change detection circuit 31 transmitted via the GOP length control circuit 34.

The compression method selection circuit 32 selects, based upon an output of the scene change detection circuit 31, which of the intra-frame coding or the inter-frame predictive-coding should be employed. In addition, the compression method selection circuit 32 introduces the intra-frame coded pictures based upon the GOP length information.

On the other hand, the quantization step controller 33 controls the quantization step of the quantizer 15 based upon the information specifying the code quantity from the variable length encoding circuit 17 and the information on the compression system as selected by the compression method selection circuit 32.

The quantizer 15 quantizes the DCT output with the above-mentioned quantization step width and transmits the quantized coefficients to the zig-zag scan circuit 16.

The zig-zag scan circuit 16 re-arrays the quantized coefficients by zig-zag scan and transmits the output to the variable length encoding circuit 17. The variable length encoding circuit 17 variable length encodes output data of the zig-zag scan circuit 16 and transmits the resulting output to the buffer 18, while transmitting the information on the code quantity as generated by variable length coding to the quantization step controller 33. On the other hand, output data from the output buffer 18 is outputted at an output terminal 2 as compressed encoded output data. The encoded output data is written by a recording device 35 on a recording medium 36. Although not shown, the recording device 35 includes an error correction code appending circuit and a modulating circuit. The recording medium 36 is specifically an optical disc which is a master disc for mass-producing ROM discs similar to compact discs. Alternatively, it is a writable disc.

Figure 7:
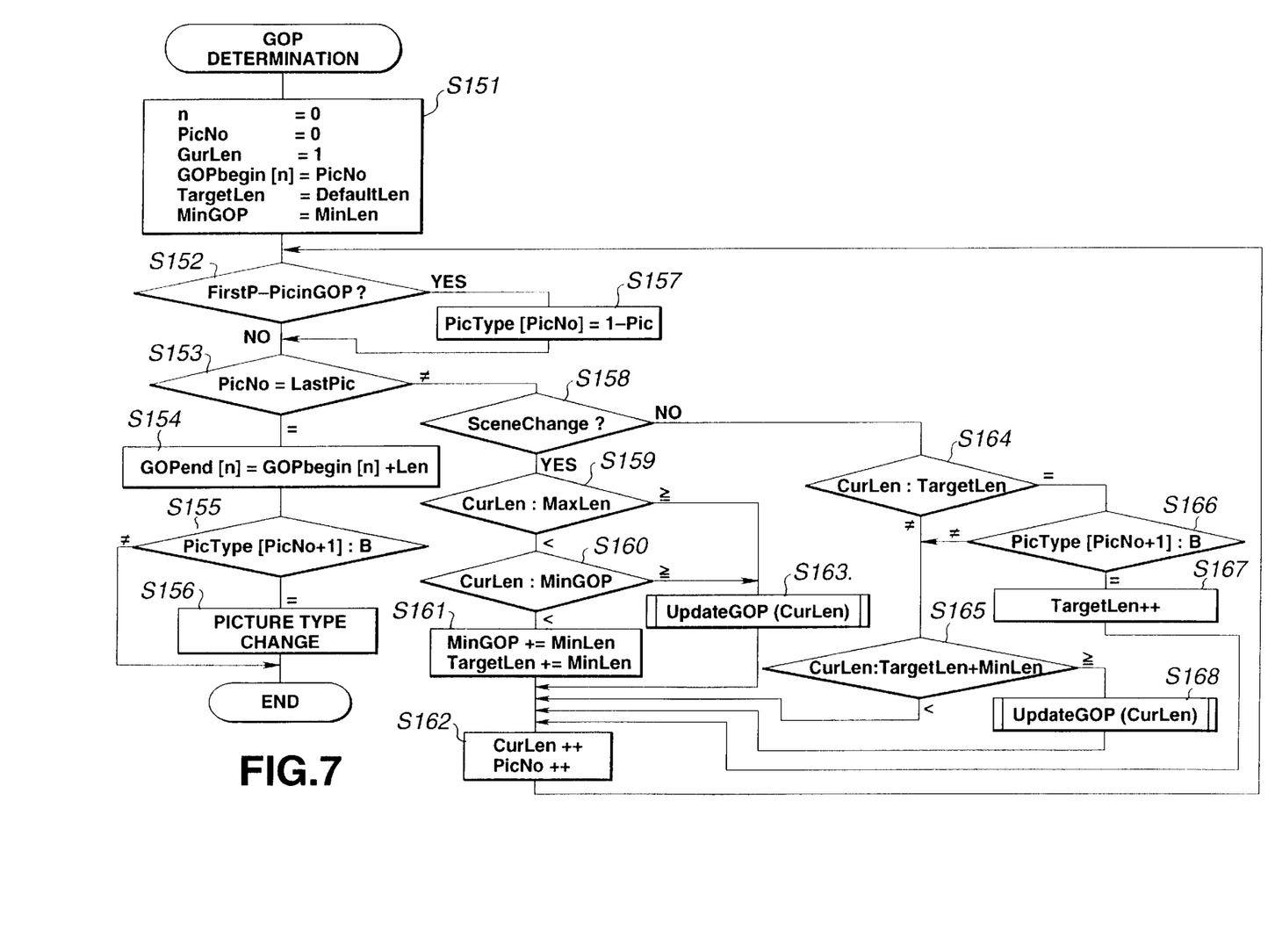
FIG. 7 is a flow chart for illustrating the process of setting a GOP.
Figure 8:
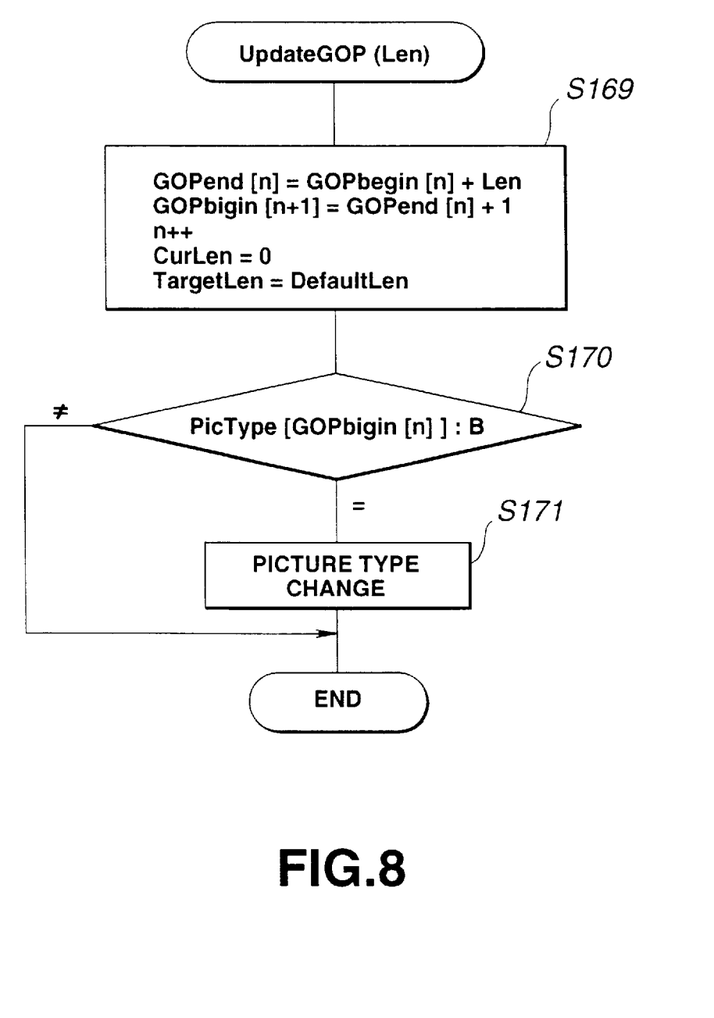
FIG. 8 is a flow chart for illustrating the process of setting picture types for the GOP thus set.

The processing flow in the construction of the present embodiment is explained by referring to the flow charts of FIGS. 7 and 8.

Before description of the flow charts of FIGS. 7 and 8, the following definition is given of constants and variables used in the flow charts.

The usual length of a GOP is a constant (DefaultLen). The length of the GOP when a number of the inter-frame predictive-coded pictures sufficient to assure suitable picture quality when there is only one intra-frame coded picture in the GOP is a variable (MinLen). The shortest boundary demarcating the GOPs is a variable (MinGOP).

The longest GOP value for assuring random accessing is a variable (MaxLen).

The target value of the next GOP demarcation is a variable (TargetLen).

The length from the leading end of the GOP is a variable (CurLen), the picture number in the coding sequence is a variable (PicLen), the variable holding the leading picture number in the coding sequence is a variable (GOPbegin[n]), and the variable holding the trailing picture number in the coding sequence is a variable (GOPend[n]).

Although not shown in the flow chart, the following conditions are presupposed.

In a previous stage, input pictures are sequentially stored in the frame memory 40 and a scene change is detected. The objective of scene detection is to detect a picture which cannot be detected efficiently by inter-frame predictive coding, as described previously. Thus the scene change may be detected by detecting the result of the difference value after motion compensation being rapidly increased as compared to the directly previous difference value.

For adaptively demarcating the GOPs, pictures for intra-frame coding are not set at the outset, and all pictures are motion-detected as P-pictures or B-pictures, depending on M. The pictures are assumed to be arrayed in the coding sequence at the time of setting of the GOPs.

The flow chart of FIG. 7 is first explained.

At step S151, the variables are first reset so that n=0, CurLen=1, PicNo=0, GOPbegin[n]=PicNo, TargetLen=DefaultLen and MinGOP=MinLen.

At the next step S152, it is checked whether or not the picture is a first P-picture in the GOP. If the picture is found at step S152 to be not the first P-picture, the program transfers to step S157 where the picture type is changed from the P-picture to the I-picture. If the picture is found at step S152 to be the first P-picture, the program transfers to step S153.

It is checked at step S153 whether or not the current picture is the last picture in the sequence. If the current picture is found at step S153 to be the last picture in the sequence, the program transfers to step S154 where the picture is set to be the last picture of the GOP. If the current picture is found at step S153 to be other than the last picture, the program transfers to step S158.

At step S155, next to step S154, it is checked whether or not the last picture in the display order is the P-picture. If the last picture in the display order is found at step S155 to be other than the P-picture, that is that the last picture is the B-picture, the program transfers to step S156. Since the sequence cannot be terminated by the B-picture, the picture is changed at step S156 to a P-picture. If the last picture is found at step s155 to be the P-picture, the processing is terminated.

At step S158, to which the program transfers when the current picture is found not to be the last picture, it is checked whether or not the scene change has occurred. If a scene change has been found to have occurred at step S158, the program transfers to step S159. If otherwise, that is if no scene change has been found to have occurred, the program transfers to step S164.

At step S159, to which the program transfers when the scene change is found to have occurred at step S158, the variable (CurLen) is compared to the variable (MaxLen). If it is found that CurLen<MaxLen, the program transfers to step S160 and, if otherwise, the program transfers to step S163.

At step S160, the variable (CurLen) is compared o the variable (MinGOP). It is found that CurLen<MinGOP, the program transfers to step S161 and, if otherwise, the program transfers to step S163.

At step S161, since the GOP is of a short length and the quantity of data generated with the I-picture cannot be distributed, the first picture after a scene change is changed to the intra-frame coded picture. For taking account of data for the I-picture, newly supplemented for scene change, MinGOP+=MinLen and TargetLen+=MinLen are set. The program then transfers to step S162.

If, at step S163, the result of comparison between the variable (CurLen) and the variable (MaxLen) specifies CurLen≧MaxLen, the GOP is divided, taking advantage of the scene change, in order to avoid the GOP becoming too long. The program then transfers to step S162.

At step S164, to which the program transfers when no scene change is deemed to have occurred at step S158, the variable (CurLen) is compared to variable (Targetlen). If, at step S164, it is judged that CurLen=TargetLen, the program transfers to step S166.

At step S166, it is checked whether or not the picture type of the next picture is the B-picture. If the next picture is found to be the B-picture, the program transfers to step S167. Since the sequence cannot be terminated with the B-picture, the target GOP length is elongated by one picture. The program then transfers to step S162.

If it is found at step S164 that CurLen is not equal to Targetlen, the program transfers to step S165 where the variable (CurLen) is compared to the variable (TargetLen) +the variable (MinLen). If, at step S165, it is found that CurLen≦TargetLen+MinLen, the program transfers to step S168. If it is found at step S165 that CurLen>Targetlen+MinLen, the program transfers to step S162.

If the GOP is divided at the target GOP length, there is no scene change within a length of picture data sufficient to distribute data generated at the leading I-picture of the next GOP. Thus the GOP is divided at step S168 at the variable (TargetLen). After step s168, the program transfers to step S162.

At step S162, the variables (CurLen) and (PicLen) are counted up. The program then reverts to step S152.

In the flow chart shown in FIG. 8, the GOP length is set at step S169 to a specified value. The variables are initialized for setting the length of the next GOP. At step S170, it is checked whether or not the last picture in the GOP in the display order is the P-picture. If the last picture is found at step S170 not to be the P-picture, that is, if the last picture is found to be the B-picture, the program transfers to step S171. Since the GOP cannot be terminated with the B-picture, the last picture is changed at step S171 to the P-picture. If the last picture is found at step S170 to be the P-picture, the processing is terminated.

In the flow charts of FIGS. 7 and 8, the following methods may be used for changing the picture type of the last picture of the GOP.

That is, the last picture in the GOP must be an I-picture or a P-picture. If the GOP is partitioned at e.g., a scene change, this is not necessarily the case with the sequence with M=2 or more. Thus, if the last picture of the GOP is the B-picture, the last B-picture is changed to a P-picture.

Figure 9A:
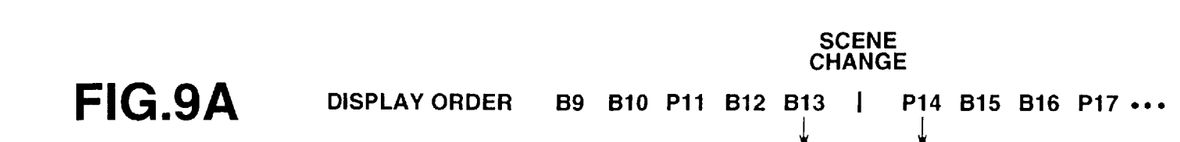
FIGS. 9A to 9D illustrate typical changes to the picture type at the GOP end.
Figure 9B:
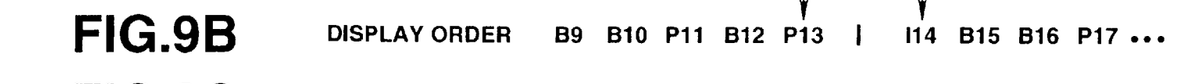
Figure 9C:
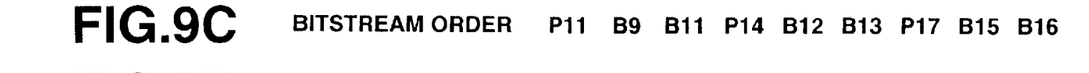
Figure 9D:
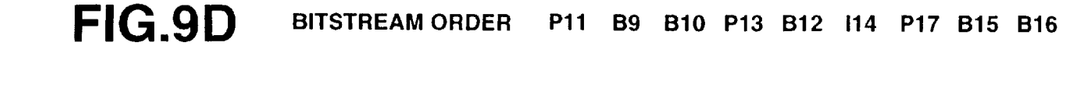

By way of an example, it is assumed that the bitstream order is as shown in FIG. 9C, with the display order being as shown in FIG. 9A, and that a scene change has occurred between the pictures B13 and P14 in the display order of FIG. 9A. In such case, the picture B13 immediately before the scene change in FIG. 9A is changed to the P-picture, such as P13, as shown in FIG. 9B. Similarly, the picture P14 immediately after the scene change in FIG. 9A is changed to the I-picture, such as I14, as shown in FIG. 9B.

Since it is difficult to execute encoding a second time in the case of a real-time encoder, when the picture B13 is changed to the picture P13, as shown in FIGS. 9A and 9B, the B-picture is encoded as a p-picture using only the forward vector from the picture P11. The picture B12 is encoded using only the forward vector from the picture P11.

With the picture encoder of the illustrated embodiment, a scene change is detected by evaluating the quantity of the information of input picture data and intra-frame coding is employed as a compression method for a picture corresponding to the scene change, thereby raising the compression efficiency at the scene change where the picture correlation is lowered.

With the embodiment illustrated, the GOP length is changed responsive to detection of scene change thereby enabling the scene change to be coincident with the GOP boundary point.

If the ratio of the number of inter-frame predictive-coded pictures to the number of intra-frame coded pictures is smaller than a pre-set ratio, the GOP length is elongated without being a length corresponding to the scene change detection output, thereby suppressing the output data to a pre-set bit rate for maintaining the picture quality.

With the picture encoding device of the present invention, the quantity of the information of the input picture data is evaluated for detecting the scene change and the intra-frame coding is used as a compression method for a picture corresponding to the detection of the scene change, thereby raising the compression efficiency at the scene change where the correlation between previous and succeeding pictures is lowered, thus assuring highly efficient picture compression and improved picture quality.

In addition, the length of the pre-set unit is changed responsive to detection of the scene change for enabling the scene change to be coincident with the boundary points between the pre-set units.

Furthermore, if the ratio of the number of inter-frame predictive-coded pictures to the number of intra-frame coded pictures is smaller than a pre-set value, the GOP length is elongated without being a length corresponding to the scene change detection output, thereby suppressing the output data to a pre-set bit rate without lowering the picture quality.

What is claimed is:

1. A picture encoding apparatus comprising:

picture data storage means for storing a plurality of input picture data representing a number of pictures;

scene change detection means for evaluating the quantity of information of the input picture data stored in said picture data storage means so as to detect a scene change and for generating a scene chance detection output signal therefrom;

selection means including a unit length control device and a compression method selection device in which said unit length control device is adapted to cause a number of intra-frame pictures and a number of inter-frame pictures in a group-of-pictures (GOP) to change based upon said scene change detection output signal supplied from said scene change detection means and in which said compression method selection device is adapted to select a compression method for a respective picture in the GOP in accordance with an output from said unit length control device or said scene chance detection means; and compression encoding means for compression encoding said input picture data in accordance with the compression method selected by said selection means.

2. The picture encoding apparatus as claimed in claim 1, wherein said unit length control device of said selection means sets a length of the GOP, and wherein said selection means changes a given inter-frame predictively coded picture to another inter-frame predictively coded picture in the GOP based upon an output of said unit length control device.

3. The picture encoding apparatus as claimed in claim 2, wherein said given inter-frame predictively coded picture in the GOP is a bi-directionally predictively coded picture (B-picture) and said other inter-frame predictively coded picture is a forwardly predictively coded picture (P-picture).

4. A recording medium having recorded thereon encoded signals formed by a picture encoding method comprising the steps of:

storing a plurality of input picture data representing a number of pictures;

evaluating the quantity of information of the input picture data from the plural stored picture data by use of scene change detection means so as to detect a scene change and generating a scene change detection output signal therefrom;

causing a number of intra-frame pictures and a number of inter-frame pictures in a group-of-pictures (GOP) to change by use of an unit length control device based upon said scene change detection output signal and selecting a compression method for a respective picture in the GOP by use of a compression method selection device in accordance with an output from said unit length control device or said scene change detection means; and compression encoding said input picture data in accordance with the selected compression method.

5. A picture encoding method comprising the steps of:

storing a plurality of input picture data representing a number of pictures;

evaluating the quantity of information of the input picture data from the plural stored picture data by use of scene chance detection means so as to detect a scene change and generating a scene change detection output signal therefrom;

causing a number of intra-frame pictures and a number of inter-frame pictures in a group-of-pictures (GOP) to change by use of an unit length control device based upon said scene change detection output signal and selecting a compression method for a respective picture in the GOP by use of a compression method selection device in accordance with an output from said unit length control device or said scene change detection means; and compression encoding said input picture data in accordance with the selected compression method.

6. The picture encoding method as claimed in claim 5, wherein said unit length control device sets a length of the GOP and wherein the step of causing and selecting changes a given inter-frame predictively coded picture to another inter-frame predictively coded picture in the GOP based upon an output of said unit length control device.

7. The picture encoding method as claimed in claim 6, wherein said given inter-frame predictively coded picture in the GOP is a bi-directionally predictively coded picture (B-picture) and said other inter-frame predictively coded picture is a forwardly predictively coded picture (P-picture).

* * * * *

UNITED STATES PATENT AND TRADEMARK OFFICE
CERTIFICATE OF CORRECTION

PATENT NO.   : 5,832,121
DATED        : Nov. 3, 1998
INVENTOR(S)  : Yuji Ando

It is certified that error appears in the above-identified patent and that said Letters Patent is hereby corrected as shown below:

Title page, item

[30]   Foreign Application Priority Data

Sep. 29, 1994  [JP]  Japan ............... 6-235102

Signed and Sealed this

Ninth Day of February, 1999

Attest:

Attesting Officer

Acting Commissioner of Patents and Trademarks